(12) United States Patent
Bress et al.

(10) Patent No.: US 9,514,789 B2
(45) Date of Patent: Dec. 6, 2016

(54) SYSTEMS AND METHODS FOR SAFELY MOVING SHORT TERM MEMORY DEVICES WHILE PRESERVING, PROTECTING AND EXAMINING THEIR DIGITAL DATA

(71) Applicants: Steven Bress, Germantown, MD (US); Mark Joseph Menz, Folsom, CA (US)

(72) Inventors: Steven Bress, Germantown, MD (US); Mark Joseph Menz, Folsom, CA (US)

( * ) Notice: Subject to any disclaimer, the term of this patent is extended or adjusted under 35 U.S.C. 154(b) by 233 days.

(21) Appl. No.: 14/311,337

(22) Filed: Jun. 22, 2014

(65) Prior Publication Data

US 2015/0006804 A1    Jan. 1, 2015

Related U.S. Application Data

(60) Provisional application No. 61/840,429, filed on Jun. 27, 2013.

(51) Int. Cl.
*G06F 12/14* (2006.01)
*G11C 5/14* (2006.01)
*G06F 21/70* (2013.01)

(52) U.S. Cl.
CPC ............... *G11C 5/148* (2013.01); *G06F 21/70* (2013.01)

(58) Field of Classification Search
CPC ......... G06F 12/14; G06F 21/75; G06F 21/70
See application file for complete search history.

(56) References Cited

U.S. PATENT DOCUMENTS

| | | | | |
|---|---|---|---|---|
| 8,539,246 B2* | 9/2013 | Seethaler | ............... | G06F 21/62 713/182 |
| 9,146,883 B2* | 9/2015 | Franceschini | ........... | G06F 12/16 |
| 2010/0281273 A1* | 11/2010 | Lee | ......... | G06F 21/72 713/190 |
| 2012/0001763 A1* | 1/2012 | Billick | ................. | G06F 15/177 340/635 |
| 2012/0151223 A1* | 6/2012 | Conde Marques | . | G06F 21/6218 713/193 |
| 2012/0239939 A1* | 9/2012 | Seethaler | ............... | G06F 21/62 713/186 |
| 2013/0067245 A1* | 3/2013 | Horovitz | ............ | G06F 12/0888 713/193 |
| 2014/0208109 A1* | 7/2014 | Narendra Trivedi | . | H04L 9/0643 713/170 |
| 2015/0310231 A1* | 10/2015 | Lin | ........................ | G06F 9/50 713/189 |
| 2015/0347724 A1* | 12/2015 | Torrey | ................... | G06F 21/12 713/190 |
| 2016/0026596 A1* | 1/2016 | Klein | ................. | G06F 13/4221 710/313 |

* cited by examiner

*Primary Examiner* — John A Lane

(57) ABSTRACT

The present invention provides a method for safely recovering, protecting, and reading short term memory devices, such as DRAM modules, following their immediate removal from a system after it powers down. By providing power and appropriate control signals, the present invention stabilizes the memory and allows it to be safely read.

15 Claims, 3 Drawing Sheets

SYSTEMS AND METHODS FOR SAFELY MOVING SHORT TERM MEMORY DEVICES WHILE PRESERVING, PROTECTING AND EXAMINING THEIR DIGITAL DATA

BACKGROUND OF THE INVENTION

Field of the Invention

The present invention relates to computer memory devices and, more specifically, to systems and methods for preserving, protecting and interrogating short term memory devices.

Description of Related Art

In the field of computer forensics, there is a need to examine the contents of a long-term memory storage device without any possibility of making changes to the device. U.S. Pat. No. 6,813,682 discloses a method for protecting the contents of long-term memory devices, such as hard drives. Hard drives and similar devices are non-volatile, meaning that when power is removed the data remains intact. The present invention describes systems and methods that allow for the preservation, protection and interrogation of data on short-term volatile memory devices, such as dynamic and static RAM. In addition, the present invention may provide write protection for the volatile RAM.

In the field of computer forensics, it is desirable to be able to get a snapshot of the state of a computer system at a given point in time. In the case of a hard drive, all that is required is that the system shut off, the drive removed, and connected to a forensics system through a device such as that described in U.S. Pat. No. 6,813,682, incorporated herein by reference. The hard drive contains a snapshot of the long-term storage component of the system, but tells nothing about the state of the short term storage, from where the operating system and applications are run. This information only exists in the system RAM, which is typically made up of DIMM (Dual Inline Memory Modules) modules on the motherboard. A DIMM is a small assembly made up of one or more memory chips, typically dynamic RAM, in a standardized form factor. Additional supporting circuitry may also be present on a DIMM.

The information in RAM is critical for a number of forensics functions, such as determining the nature of any malware that may be running. It also provides a unique snapshot as to the state of the system. The RAM may also contain evidence that would not otherwise be found on a hard drive. Attempting to use a program on a running computer to read the short term memory changes the data in the short term memory, as the program itself is run from this memory. For computer forensics work, that is not an optimal solution.

It is common knowledge that when power is removed from a memory device, such as Dynamic RAM, that the contents of the RAM will be lost. What is not as well known is that the contents of the RAM do not instantly change. There is a very short period of time after power is removed that all of the contents of the RAM is intact. This period of time can be as short as a couple of hundred milliseconds. In some cases, it can be longer. The actual amount of time that the data remains valid is variable, but may be adjusted by a number of factors.

The primary variable that is common to most typical Dynamic RAM designs is that of temperature. If the RAM module is cooled far enough, which can be accomplished using commercial, off-the-shelf cooling spray, the amount of time before the data begins to change may be measured in seconds. With proper cooling, the data can remain valid for 10-20 seconds, and if cooling is maintained, sometimes much longer.

There are numerous methods with which to chill the memories. In order to preserve their contents, their temperature typically needs to be dropped well below the freezing point of water. As mentioned before, commercial, off the shelf "freeze" sprays can accomplish this, as can other methods including Freon and even liquid nitrogen. This is not meant to be an exhaustive list. Refrigeration and chilling techniques are well known in the art. Up to a point, cooler is better, especially considering that until the memories are chilled enough to have power removed, they are actively generating heat. Also, the body heat of the operator moving the memories can quickly remove the chill from the memories.

While 10-20 seconds might not seem like a very long time, it is enough for a skilled operator to chill the memories in a system, power off the machine, and transfer the memories to another device to be safely powered up and read. One of the problems that an operator would encounter when trying to move the memories is that most PCs have two or more DIMMs. The data is often interleaved between the modules, so all of the modules need to be moved successfully in order to read valid data. There are devices designed to test RAM, but the tests are destructive, meaning that they alter the contents of the RAM under test. One familiar with the field of Computer Forensics would recognize that any change to an item under investigation or in custody is to be avoided. There are devices on the market, such as memory testing devices and EPROM programmers that are capable of performing tests on short term memory devices. Since the assumption of existing devices is that short term memory devices have no important data, the tests are destructive to any data that might be contained in the memories.

Accordingly, there is a need for Safely Moving Short Term Memory Devices while preserving and protecting their contents so that their Digital Data may be examined.

TERMS AND DEFINITIONS

Short Term Memory—A form of computer memory whose data degrades or is lost when power and/or controlling signals are removed.

Dynamic RAM—A form of computer memory whose data degrades or is lost when power or controlling signals are removed. Typically found in DIMMs.

Static RAM—A form of computer memory whose data degrades or is lost when power is removed.

DIMM—A circuit containing one or more RAM chips in a standardized form factor.

Target Machine—A computing device that has information in its short term memory for which there is a need to read without modification.

Host Machine—A computing device that is connected to the present invention.

Memory Reader Device or Memory Reader or Short Term Memory Protection, Maintenance and Reading Device—The present invention.

CHIP and Module—These refer to different packaging configurations of Short Term Memory.

SUMMARY OF THE INVENTION

Systems and methods consistent with the present invention address these and other needs by providing for a protection device with a plurality of memory chip sockets, designed for chilled short term memory chips to be plugged into, wherein the logic and circuitry is configured to independently power on and refresh a memory chip socket when a memory chip is detected. In this manner a short term memory chip can be chilled and removed from its original system and safely moved to the memory protection device.

One aspect of the present invention is directed toward a memory protection device which powers and refreshes memory as quickly as possible. An additional requirement is to be able to examine the moved short term memory, either on the spot or at a later time.

Often the state of the memory chips being protected by the memory protection device needs to be maintained. In order to accomplish this, the present invention may include write protection logic and circuitry.

There are cases where the memory chips needs to be returned to their original system. Therefore the memory protection device may include internal memory along with logic and circuitry to read the memory chips. In one embodiment, the memory protection device would act as an intermediary between a host machine with long term storage, such as a PC or mobile device. In another embodiment, the memory protection device would have its own long term storage so that it could immediately store the data read from the chilled memory chips.

In order to control the temperature of the memory chips plugged into the memory protection device and to control condensation, the memory protection device may include temperature control, humidity control, and air control devices. The key observation is that one familiar with the field of Computer Forensics would recognize that it is desirable to avoid any change to an item under investigation or in custody.

For the sake of this discussion, we will assume that a short-term memory device is a DDR RAM DIMM module of the type typically clipped onto a standard PC. The current invention is by no means limited to a short term memory device with this configuration. One skilled in the art would recognize that other configurations, such as SO-DIMM for laptops, use similar types of memory, and that these DIMM modules are made up of individual RAM chips that also may benefit by the techniques taught herein. Further, any PC or other type of computing device that has a socket or other method that allows for the easy removal of its short term memory devices may make use of the present invention. Without a socket, it is more difficult to work with the memory, but not impossible, as will be seen later.

BRIEF DESCRIPTION OF THE DRAWINGS

In order to simplify the following discussion, the present invention will be referred to as a "Memory Reader Device" or "Memory Reader."

DETAILED DESCRIPTION

Figure 1:
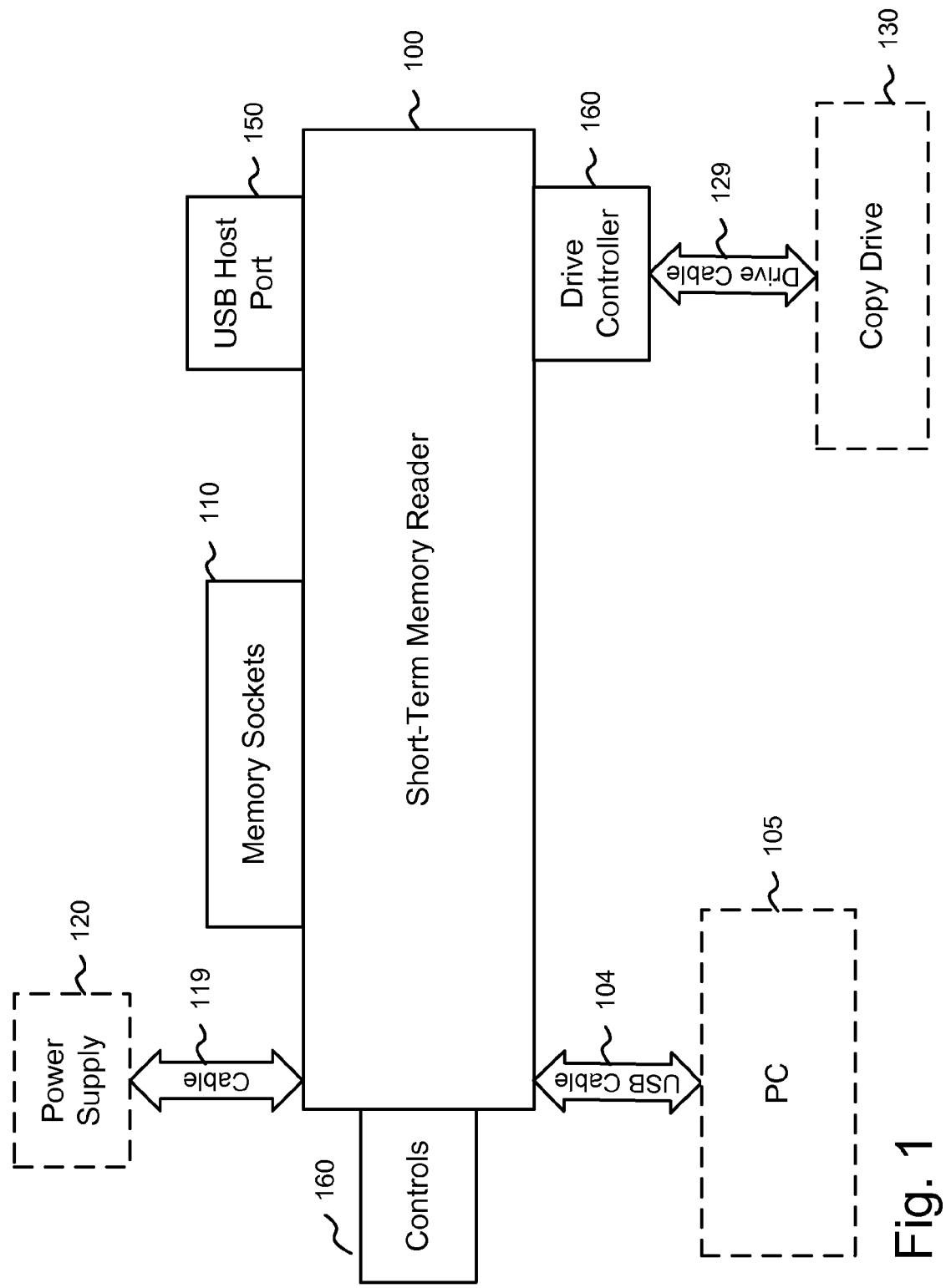
FIG. 1 shows the basic block diagram of the present invention.

The present invention provides a method for safely recovering, protecting, and reading short term memory devices, such as DRAM modules, following their immediate removal from a system after it powers down. By providing power and appropriate control signals, the present invention stabilizes the memory and allows it to be safely read.

The present invention addresses the issue of needing to support multiple DIMM modules as well as other technical issues, such as powering on a chilled memory device without causing loss or corruption of its data. The following discussion is about the preferred embodiment of the system. In no way does this limit the invention to just these features.

The present invention is a device that supports the reading of short-term memory devices. In the preferred embodiment, it has a number of user accessible sockets matching or exceeding the number of memory devices to be read from a target system. For many systems that use DDR2 Memory modules, four sockets are sufficient. Keeping the memory active in a dynamic RAM chip requires that the chip be powered up and that appropriate refresh signals be generated. The refresh cycles keep the memory cells charged and the data valid.

It is important that power be restored to each memory module as soon as possible after being inserted into its socket on the present invention. The present invention can detect that a memory module has been inserted and commence the power on and refresh sequence. Additionally, a user may initiate the power on and refresh sequence.

Short term memory devices are not typically designed to be "hot-swapped", or plugged into a system that is powered up. Doing so can damage the device or harm any data that is stored in the device. By allowing each memory socket to power up individually, the first chip to be moved does not have to wait for the last chip to be moved before getting its power and refresh started. This increases the likelihood that data on the short-term memory device will remain unchanged.

After the memory chips have been moved from their original system to the present invention, the data may be read. In the preferred embodiment, a USB port connects the present invention to a PC. Through this port, instructions may be given to the present invention requesting it to transfer the data from the short term memory to the PC.

In addition to keeping the data valid by the proper application of power and refresh cycles to the short term memory, the present invention protects the data on the attached memory. If one were to try and transfer the memory devices to a standard PC, data would be lost as soon as the PC started to boot. The BIOS on a standard PC is designed to make use of any memory chips as system memory and immediately starts writing to it. The present invention is specifically designed not to write any data to the memories or in any way cause them to change the stored data.

In a typical PC, the capabilities of the DIMM modules are determined by reading data about each DIMM module from a Serial Presence Detect (SPD) chip. This chip has information about capabilities, speeds, and even manufacturer information about the DIMM module. In a PC, this information is used by the BIOS to set the basic operating parameters of the memories. The SPD chip is typically a small FLASH chip on the module that is physically separate from the memory chips, yet on the same carrier PC Board.

In a PC operating at ambient household or office temperatures, this configuration works quite well. However, when a DIMM module is chilled below the point where the chips on the module quit working, there is another consideration. It is important to restore power and refresh signals to the RAM chips on the module as quickly as possible. Normally, one would simply read the SPD chip and set the appropriate timing parameters. For the present invention, this is not a preferred method. The SPD chip will be chilled along with the memory chips, and there is no way to know in advance if the SPD chip will resume operations before or after the RAM chips. Since the SPD chip uses a different type of technology for its memories than the RAM chips, its response to thermal changes is likely to be quite different.

Waiting for the SPD chip to become operational may cause an unacceptable delay in starting the refresh signals. To avoid any such delays, the present invention makes assumptions about the memory modules. It has to assume that the memory modules are the largest that are available for the socket type and set the refresh rate to the fastest that is supported by the socket type. While these parameters may be adjusted at a later time when the data from the SPD chip is available and valid, these assumptions provide a safe method for maintaining valid data in the RAM chips regardless of the state of the SPD chip. Data from the SPD chips may have some forensics value, and can be optionally saved to an attached PC or an internal mass storage device along with the data from the memory module.

The present invention deals with memory timings in another fashion. A PC is concerned with reading its memory as quickly as possible, thereby maximizing the data throughput. The highest possible read speed is not as important to the present invention as the safety of the data. In fact, slowing down the reading speed to a very low speed will produce data as fast or faster than the mass-storage device to which the data is being copied or the interface through which a PC is connected. The slower data rates provide for more robust timing signals and minimizes the effects of trace length, crosstalk, and other design considerations that plague memory system designs.

DETAILED DESCRIPTION OF THE DRAWINGS

The drawings illustrate a preferred embodiment of the present invention. They in no way illustrate the only embodiment.

FIG. 1 shows the basic block diagram of a Memory Reader 100. It has sockets for the memories to be read 110. The number and type of sockets depend on the specific application for the device. Laptop computers tend to have one or two memory modules, while desktop PCs typically have from two to six. Memory Reader 100 is powered by power supply 120 through power cable 119. Controls for the unit 160 includes a master power switch. Powering on the unit does not necessarily power on any of the memory modules 110. In most embodiments, powering up the sockets and the memory signals is under intelligent control so as not to harm the data on the memories to be read.

The Memory Reader has a USB port that is used for communication with a Host Machine 105. Cable 104 is used to make the connection. The Host Machine may be used to receive the data from the memories. In some cases, it is desirable to immediately store the data from the memories to a long term-storage device, such as a hard drive. Drive controller 160 communicates with a hard drive 130 through cable 129 so that the Memory Reader may make such copies without requiring a connection to a PC. In other embodiments the USB port may be augmented or replaced by other types of communications ports as might be prevalent in available Host Machines, such as Wifi and BlueTooth.

Given the prevalence of low cost FLASH drives and the relatively small capacity of short-term memory devices compared to long-term ones, it is reasonable to store all of the short-term memory from a typical system to a USB type Mass Storage Device drive. To facilitate this, the Memory Reader has a USB Host Port 150 that can directly control a USB Mass Storage Device 135.

Figure 2:
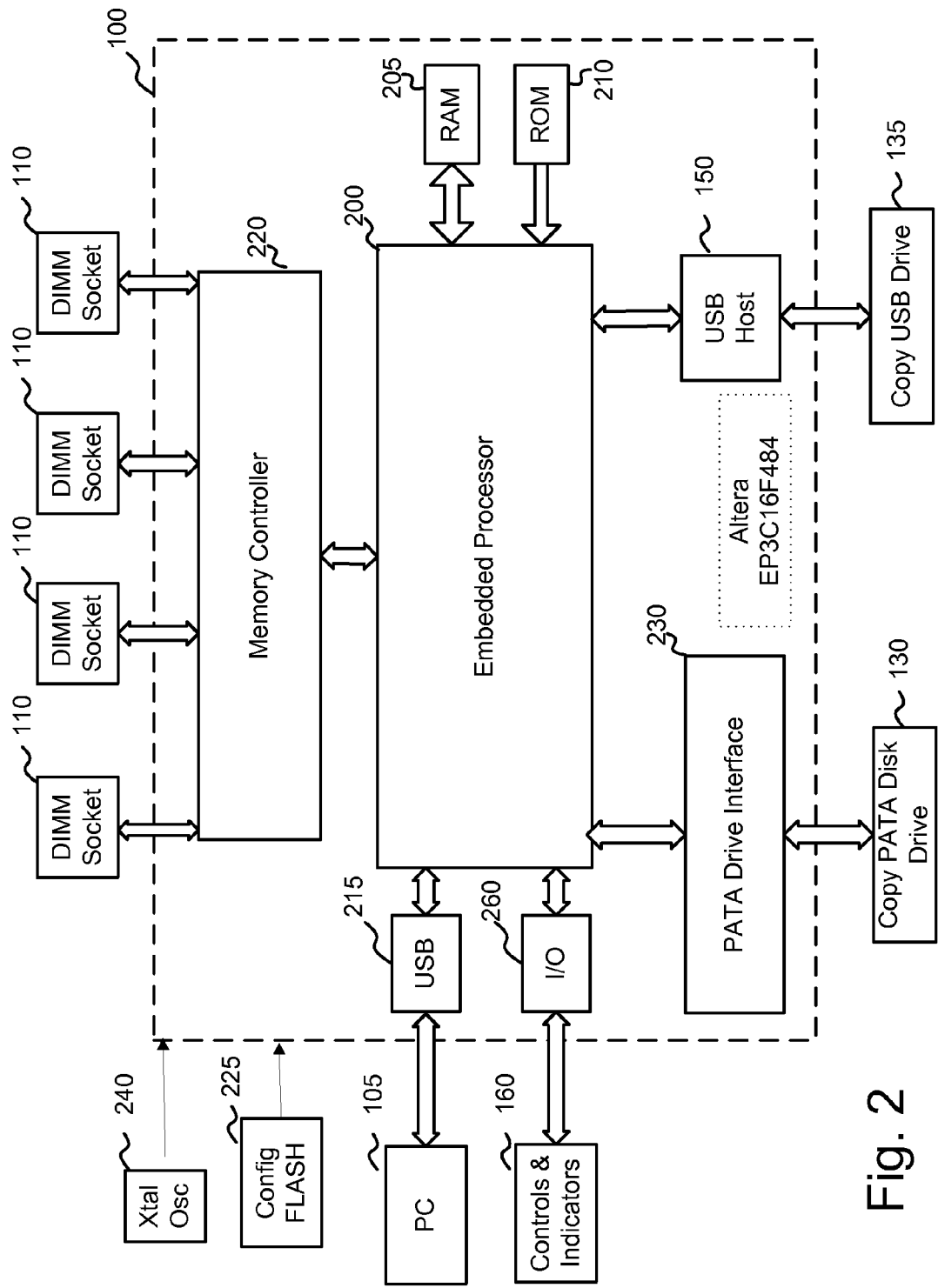
FIG. 2 shows additional detail as to the internal block diagram of the present invention.

FIG. 2 goes into additional detail regarding the workings of the Memory Reader 100. As can be seen from this drawing, a Field Programmable Gate Array (FPGA) may be used to create most of the functionality of the Memory Reader. In this case, an FPGA from Altera® Corporation, San Jose, Calif., is used, specifically the EP3C16F484, a device in the Cyclone® III family with enough I/O pins to comfortably create a memory controller.

In order to configure the FPGA 100, a FLASH configuration device 225 is used. Crystal Oscillator 240 provides for accurate system timing.

RAM 205 and ROM 210 are instantiated from the FPGA for the use of the Embedded Processor 200, which is a version of Altera's NIOS® soft processor.

USB Device port 215 provides communication capabilities to PC 105. A USB Host port 150 allows low cost USB FLASH drives 135 to be used to receive a copy of the data from RAM being examined. Other USB mass storage devices may also be connected to the Memory Reader through this port.

Another interface for connecting long-term storage devices is provided by the PATA Drive Interface 230. PATA stands for Parallel ATA, otherwise known as IDE drives 130. This type of drive includes the low power, high density drives such as those commonly found in MP3 players. These drives provide a significant amount of storage, can be written to very quickly, and are low power.

The last major element in this design is the Memory Controller 220. This section acts as the bridge between the Embedded Processor 200 and the DIMM Sockets 110. Depending on the type of RAM being used, the specified Altera chip can support between one and four sockets without having to share signal pins. This allows for each socket to have its own complete set of signals, which minimizes the likelihood that inserting one DIMM will cause glitches in the signals going to another DIMM.

One skilled in the art of FPGA design would understand that the intellectual property (IP) representing the interface logic to common short term memory devices, such as DDR memory sockets, may be licensed and directly implemented in the FPGA, such as the Altera one referenced. What is not so obvious is that the IP for such memory types typically is not safe for use in the present invention, at least in its default implementation. As mentioned earlier, there should be no attempt to change the data on the short term memory devices being analyzed. The default behavior for some of the IP implementations is to "test" the memories upon power up, and this is a destructive test. Default behavior of some IP implementations needs to be modified in order to protect data. Otherwise, the interface logic would need to be custom designed so as not to have the undesirable behavior of modifying the memory contents.

Figure 3:
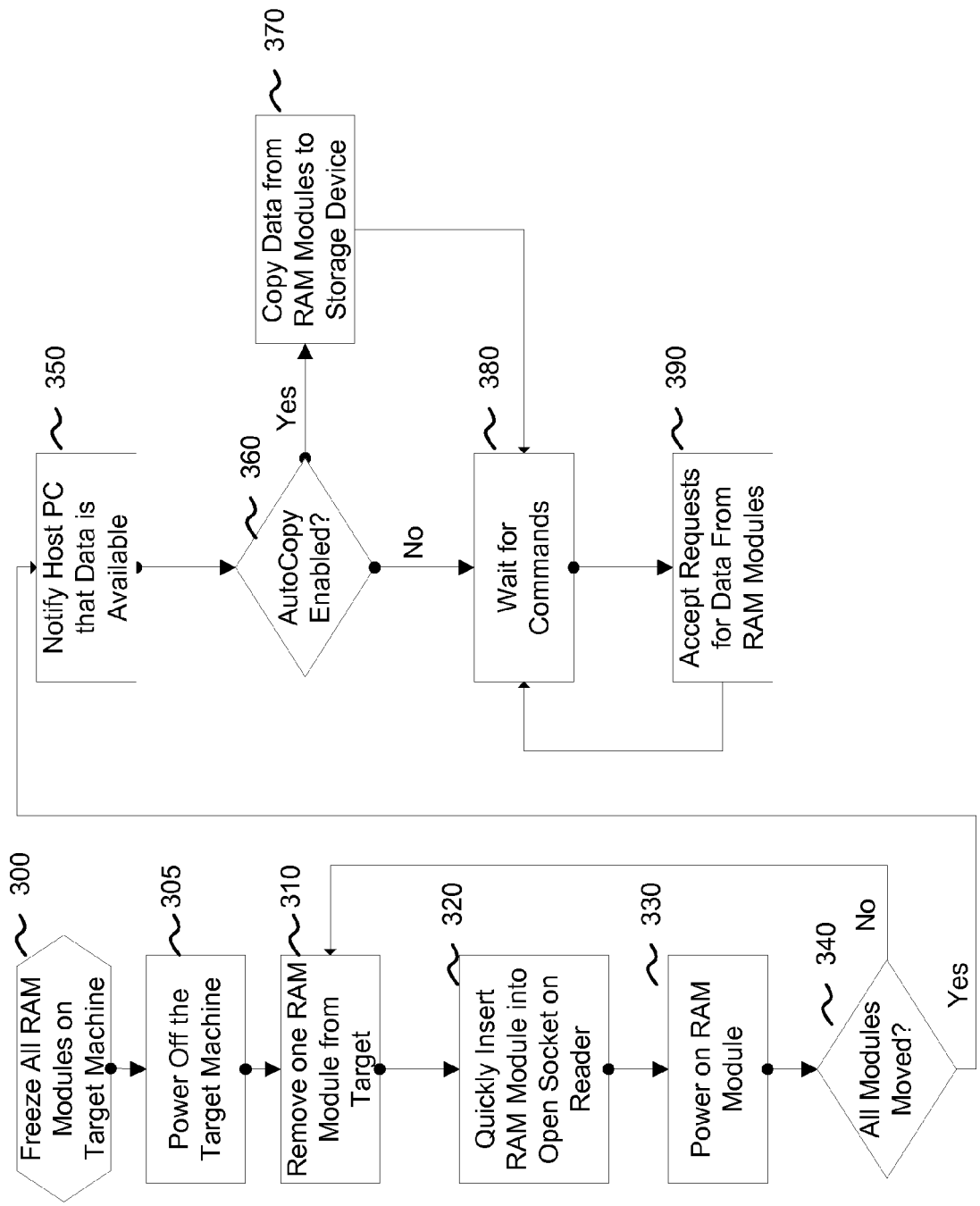
FIG. 3 shows a flowchart of the present invention in use.

FIG. 3. shows the logic for the sequence used by the Memory Reader. In the first step 300, the operator chills the chips that are going to be read, typically using a can of cooling spray. All of the chips must be chilled during this step, since the Target Machine will be powered off in the next step 305.

Once the Target machine has been powered down, time is of the essence. There is a limited amount of time during which the data will stay valid in the DIMM modules. A DIMM module is removed from the Target Machine 310, and quickly inserted into an open socket on the Memory Reader 320. If the Memory Reader can detect that the DIMM module has been inserted, it will power on the socket automatically 330 and indicate the modules status to the user. In some cases, the Memory Reader may not detect the memory, and the user will have to initiate the power on sequence 330. This could theoretically happen if the DIMM module has been made so cold as to not be operational or in the case of a physical detection sensor failure. In cases of extreme cold, the data in memory is still preserved, but the control circuitry inside each memory chip may not be functional. As the chip warms up, full functionality should return.

This process is repeated 340 until all of the chips from the Target Machine have been moved. If they have been moved to the Memory Reader and a Host PC is connected, the Memory Reader can notify the Host PC that data is available 350.

If the Memory Reader has a long-term storage device attached with enough free space, the Memory Reader can start the process of copying data from the memories 360. The data from all of the memory modules is copied out to the long-term storage device 370.

If the Memory Reader is connected to a Host PC, the PC may issue commands to the memory reader 380, such as requests for information about the memory modules or the data itself 390.

Additional Embodiments

There are additional embodiments of the present invention that can increase its functionality and utility.

For field forensics use, it may be more important to get the memory devices removed from a target computer than to actually process the data. For this case, an embodiment of the present invention uses batteries or other non-grid power device to maintain power to the unit and any short term memory devices that may be plugged in to it. Batteries, Capacitors, fuel cells, solar, or any other internal or external power source may be used to completely power the unit or partially charge its internal power storage system.

Power for the present invention may come from a dedicated power supply. Other embodiments may make use of other power sources as appropriate. Some interface specifications, such as USB, FireWire, and even Power over Ethernet (PoE) have provisions to power the device through its interface cable. The available power through interface cables varies by the interface type. In some embodiments, this will be enough power to completely power the present invention and its attached memories. In others, it may be enough to provide a partial charge to an internal power storage system and extend the amount of time before loss of power.

An additional embodiment of the present invention is to have it automatically scan and save all of attached memory devices to a local long-term storage device, such as a FLASH drive, a solid state drive, or magnetic hard drive. This has a benefit for field forensics use as a backup copy of the data may be started immediately upon powering up a socket and stabilizing the memories. No external PC or controller is necessary for this backup process to commence. Given the speed of hard drives, all of the short term memory that makes up a typical PC could be safely backed up to long-term storage in a short period of time, such as a few minutes or less. For a Computer Forensics tool as described, it may be reasonable to use short term memory for internal storage.

FIG. 2 shows a single memory controller supporting four sockets. While this will certainly work for certain memory configurations, there may be others in which too many signals would need to be shared between powered and unpowered sockets. Ideally, each signal pin for each socket would have a unique signal pin on the memory controller. The concern is that the act of inserting a memory device in one socket could lead to a destructive glitch on the memory device in another. Given that current generation DIMM modules can have 240 pins, one skilled in the art would understand that a single FPGA that could support even two memory sockets would be prohibitively expensive.

In this case, low cost electronic switches may be used to connect the signal lines from the memory controller to each socket in order to keep them electrically isolated during the insertion and power on operations.

Another embodiment makes use of multiple low cost FPGA chips by dedicating one FPGA per memory socket. In this example, one FPGA chip would be used for each short-term memory device. With careful programming, they could also share the same configuration device, which would help to keep down the cost.

Another embodiment extends on the principle of using multiple FPGA chips to control the memory sockets. In this embodiment, each FPGA can be programmed individually to support a different socket type, allowing for the design of a unit that can be flexible as to the types of memory that it can support. For example, it may have two DIMM modules and two SODIMM modules. A unit such as this could support both a desktop and a laptop computer.

In a similar fashion, another embodiment makes use of "Socket Modules" that can be plugged into the unit for ease of configuration. It might be tempting to consider the option of making a socket for a socket in order to keep costs low. This would be similar to the adapters used in EPROM programming devices to allow support for a wide variety of device types. This would not be an optimal solution as there is always some signal degradation as a signal passes through a socket. The memories being read have an unknown heritage and if the present invention is being used, the data is considered to be quite important. As such, a preferred embodiment would be to have the memory controller, which will typically be an FPGA, built right into the Socket Module. In this manner, the signal path to the socket may be kept as short and clean as possible, providing the highest quality signals to the memory being read.

Another advantage to using removable Socket Module is that the present invention may be revised in the field. By creating a new Socket Module that has a new type of memory socket, simply connecting the new socket module to the present invention allows for it to process a different type of memory. The socket on the present invention into which a socket module plugs does not need to match the format of any common form of memory, as the socket on the socket module provides the compatibility with standard memory types.

Additionally, Socket Modules address a problem in that memory sockets are not designed for unlimited insertions and removal of memories. In a typical PC, once the memory is in, it never leaves. Maybe once for an upgrade. This limits the potential lifetime for the memory socket when used in a memory reader. By having the sockets on a replaceable module, they can be returned to the factory to be refurbished, and replacement Socket Modules may be provided to the user so that there is no downtime with the equipment.

Another embodiment copies the data from the short-term memories into memory that is internal to the Memory Reader. This allows for the fastest possible backup of the data, as the copy speed is not dependent on the speed of a long-term storage device.

In some environments, condensation from the recently chilled memory modules could present a problem. Most electronic equipment does not work well when wet. In order to help control the condensation, an embodiment of the present invention can produce heat and disperse it over the memory modules to quickly evaporate any moisture. The heat may be generated by a Peltier module or any other standard heat producing method. This same Peltier module may also provide cooling, should it be necessary. Fans or other air control devices may be used to guide the heat to its appropriate location. In addition, since it is desirable to have very dry air to help speed evaporation, the air may be passed through desiccant material before reaching the chips to be dried.

An embodiment of the present invention that has application for field computer forensics work is as follows. It is a portable, battery powered unit. It has Socket Modules so that the investigator may configure the unit in the field once a determination is made as to the type(s) of memories to be read. It stores the read data to either a removable mass storage, or a fixed internal one. A unit such as this would allow for an investigator to quickly read the memories and put them back in the original system.

SUMMARY

Systems and methods consistent with the present invention provide for a memory protection device with a plurality of memory chip sockets, designed for chilled short term memory chips to be plugged into, wherein the logic and circuitry is configured to independently power on and refresh a memory chip socket when a memory chip is detected. In this manner a short term memory chip can be chilled and removed from its original system and safely moved to the memory protection device.

While there is no guarantee that every last byte can be recovered using the hardware and techniques described herein, it takes a tool such as this to give a computer forensics examiner the best chance of data recovery.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A short term memory protection, maintenance and reading device that accepts chilled short term memory from a target machine for the purpose of preserving and protecting said short term memory, comprising:
   a. one or more memory sockets;
   b. logic and circuitry coupled to the memory sockets configured to detect when a short term memory is inserted into a memory socket, and configured to provide power and control signals required to maintain the integrity of the short term memory upon detection wherein said logic and circuitry is configured to not write to the short term memory, and;
   c. a data port.

2. The logic and circuitry of claim 1 further configured to read the short term memory.

3. The short term memory protection, maintenance and reading device of claim 1 further comprising a plurality of interfaces to a host computing device.

4. The short term memory protection, maintenance and reading device of claim 1 further comprising internal memory storage.

5. The short term memory protection, maintenance and reading device of claim 1 further comprising means for an operator to initiate power and control signals needed to maintain the integrity of the short term memory.

6. The logic and circuitry of claim 1 further configured to write protect any short term memory inserted into the memory sockets, from a second device connected through the data port.

7. The short term memory protection, maintenance and reading device of claim 1 further comprising temperature, humidity, and air control devices configured to adjust the temperature of a memory chip inserted into a memory chip socket.

8. The short term memory protection, maintenance and reading device of claim 1 wherein one or more of the memory sockets is configured to accept a short term memory compatible adapter.

9. A short term memory protection, maintenance and reading device that accepts chilled short term memory from a target machine for the purpose of preserving and protecting said short term memory, comprising:
   one or more sockets,
   one or more modules configured to plug into the sockets, wherein each module comprises:
   a. one or more memory sockets compatible with short term memory devices
   b. logic and circuitry coupled to the sockets configured to detect when a short term memory is inserted into a memory socket, and configured to provide power and control signals required to maintain the integrity of the short term memory upon detection
   wherein said logic and circuitry is configured to not write to the short term memory
   a data port.

10. The logic and circuitry of claim 9 further configured to read the short term memory.

11. The short term memory protection, maintenance and reading device of claim 9 further comprising a plurality of interface(s) to a host computing device.

12. The short term memory protection, maintenance and reading device of claim 9 further comprising internal memory storage.

13. The short term memory protection, maintenance and reading device of claim 9 further comprising means for an operator to initiate power and control signals needed to maintain the integrity of the short term memory.

14. The logic and circuitry of claim 9 further configured to write protect any short term memory inserted into the memory sockets, from a second device connected through the data port.

15. The short term memory protection, maintenance and reading device of claim 9 further comprising temperature, humidity, and air control devices configured to adjust the temperature of a memory chip inserted into a memory chip socket.

* * * * *